(12) United States Patent
Wright et al.

(10) Patent No.: US 10,560,308 B2
(45) Date of Patent: *Feb. 11, 2020

(54) CORRELATION ACROSS NON-LOGGING COMPONENTS

(71) Applicant: MICROSOFT TECHNOLOGY LICENSING, LLC, Redmond, WA (US)

(72) Inventors: David Christopher Wright, Seattle, WA (US); Arijit Chatterjee, Sammamish, WA (US); Qingqing Yuan, Sammamish, WA (US); Praveen Kumar Barli, Bothell, WA (US); Basaveshwar S. Hiremath, Redmond, WA (US); Nosheen M. Syed, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/675,028

(22) Filed: Aug. 11, 2017

(65) Prior Publication Data

US 2019/0052516 A1 Feb. 14, 2019

(51) Int. Cl.
*H04L 12/24* (2006.01)
*G06F 9/46* (2006.01)
(Continued)

(52) U.S. Cl.
CPC .......... *H04L 41/0631* (2013.01); *G06F 9/466* (2013.01); *G06F 11/2221* (2013.01); *H04L 43/04* (2013.01); *G06F 16/00* (2019.01)

(58) Field of Classification Search
CPC ...... G06F 9/466; G06F 11/2221; G06F 16/00; G06F 11/0793; G06F 11/1471;
(Continued)

(56) References Cited

U.S. PATENT DOCUMENTS 5,682,328 A * 10/1997 Roeber ............... G06F 11/3476
702/187
6,598,041 B1 * 7/2003 Bernal .................. G06F 16/284
(Continued)

OTHER PUBLICATIONS

"Final Office Action Issued in U.S. Appl. No. 15/674,982", dated Apr. 24, 2019, 20 Pages.
(Continued)

*Primary Examiner* — Le H Luu
(74) *Attorney, Agent, or Firm* — Workman Nydegger

(57) ABSTRACT

Systems are provided for logging transactions in heterogeneous networks that include a combination of one or more instrumented components and one or more non-instrumented components. The instrumented components are configured to generate impersonated log records for the non-instrumented components involved in the transaction processing hand-offs with the instrumented components. The impersonated log records are persisted with other log records that are generated by the instrumented components in a transaction log that is maintained by a central logging system to reflect a complete flow of the transaction processing performed on the object, including the flow through the non-instrumented component(s).

18 Claims, 11 Drawing Sheets

(51) Int. Cl.
*G06F 11/22* (2006.01)
*H04L 12/26* (2006.01)
*G06F 16/00* (2019.01)

(58) Field of Classification Search
CPC ............ G06F 11/1662; G06F 11/3058; G06F 11/3476; G06F 16/284; G06F 21/10; G06F 9/546; H04L 41/0631; H04L 43/04; H04L 63/1425; G06Q 10/10; G06Q 20/042
See application file for complete search history.

(56) References Cited

U.S. PATENT DOCUMENTS

| | | | |
|---|---|---|---|
| 6,606,304 B1* | 8/2003 | Grinter | G06Q 10/10 340/573.4 |
| 7,039,921 B2 | 5/2006 | Shah et al. | |
| 7,389,914 B1* | 6/2008 | Enright | G06Q 20/042 235/379 |
| 8,689,048 B1 | 4/2014 | Novick et al. | |
| 9,361,306 B1 | 6/2016 | Pawar et al. | |
| 9,544,378 B2 | 1/2017 | Brown | |
| 10,313,376 B2* | 6/2019 | Thom | H04L 63/1425 |
| 2003/0172091 A1 | 9/2003 | Norcott | |
| 2004/0255182 A1* | 12/2004 | Lomet | G06F 11/1471 714/2 |
| 2006/0129414 A1 | 6/2006 | Hallamaa et al. | |
| 2012/0066166 A1 | 3/2012 | Curbera et al. | |
| 2012/0297371 A1 | 11/2012 | Greifeneder et al. | |
| 2013/0159249 A1* | 6/2013 | Dewall | G06F 11/1662 707/610 |
| 2014/0289033 A1 | 9/2014 | Ortigoza | |
| 2015/0199249 A1 | 7/2015 | Dahan | |
| 2015/0286470 A1 | 10/2015 | Dahan | |
| 2017/0199806 A1 | 7/2017 | Dahan et al. | |
| 2017/0270494 A1 | 9/2017 | Nayak et al. | |
| 2018/0102938 A1* | 4/2018 | Yoon | G06F 9/546 |
| 2018/0217882 A1* | 8/2018 | Broadhurst | G06F 9/546 |
| 2018/0246552 A1* | 8/2018 | Thompson | G06F 11/3058 |
| 2018/0278582 A1* | 9/2018 | Cleaver | G06F 21/10 |
| 2018/0329956 A1 | 11/2018 | Mittal et al. | |
| 2019/0004891 A1* | 1/2019 | Bi | G06F 11/0793 |
| 2019/0052517 A1 | 2/2019 | Wright et al. | |
| 2019/0052699 A1 | 2/2019 | Wright et al. | |

OTHER PUBLICATIONS

Geels, Dennis Michael, "Replay Debugging for Distributed Applications", In Technical Report No. UCB/EECS-2006-163, Dec. 8, 2006, 87 pages.

Chatterjee, Arijit, "Introducing Zipkin-Azure", https://blogs.msdn.microsoft.com/microsoftrservertigerteam/2017/05/10/introducing-zipkin-azure/, Published on: May 10, 2017, 3 pages.

Song, et al., "Process Discovery from Dependence-Complete Event Logs", In Journal of IEEE Transactions on Services Computing, vol. 9, No. 5, Sep. 2016, pp. 714-727.

Karumuri, Suman, "Distributed tracing at Pinterest with new open source tools", https://medium.com/@Pinterest_Engineering/distributed-tracing-at-pinterest-with-new-open-source-tools-a4f8a5562f6b, Jun. 15, 2017, 7 pages.

"Tracing", https://github.com/01org/ciao/wiki/Tracing, Retrieved on: Jun. 15, 2017, 6 pages.

Sigelman, et al., "Dapper, a Large-Scale Distributed Systems Tracing Infrastructure", In Google Technical Report dapper-2010-1, Apr. 2010, pp. 1-14.

"Non Final Office Action Issued in U.S. Appl. No. 15/674,982", dated Oct. 18, 2018, 18 Pages.

"International Search Report and Written Opinion Issued in PCT Application No. PCT/US18/038644", dated Sep. 27, 2018, 14 Pages.

"International Search Report and Written Opinion Issued in PCT Application No. PCT/US18/039622", dated Oct. 15, 2018, 12 Pages.

"Non Final Office Action Issued in U.S. Appl. No. 15/675,050", dated May 2, 2019, 43 Pages.

"International Search Report and Written Opinion Issued in PCT Application No. PCT/US2018/039623", dated Oct. 11, 2018, 13 Pages.

"Notice of Allowance Issued in U.S. Appl. No. 15/674,982", dated Aug. 30, 2019, 16 Pages.

Mohan, et al., "Aries: A Transaction Recovery Method Supporting Fine-Granularity Locking and Partial Rollbacks Using Write-Ahead Logging", In Journal of ACM Transactions on Database Systems (TODS), vol. 17, Issue 1, Mar. 1, 1992, pp. 94-162.

* cited by examiner

*600*

610
Receiving A First Component Log Record, The First Component Log Record Being Generated By A First Component That Is Instrumented For Generating Log Records Associated With Handling Of Transaction Processing, The First Component Log Record Being Generated In Response To The First Component Receiving Or Processing The Transaction Processing

620
Receiving An Impersonated Information Log Record That Is Associated With Handling Of The Transaction Processing By A Second Component That Received A Handoff Of The Transaction Processing From The First Component, The Impersonated Information Log Record Being Generated By The First Component Rather Than From The Second Component, Wherein The Second Component Is A Non-logging Component And Wherein The Impersonated Information Component Log Record Was Generated By The First Component In Response To A Determination That The Second Component Is A Non-logging Component

630
Logging The First Component Log Record And The Impersonated Information Component Log Record Into Persistent Storage To Reflect A Flow Of The Transaction Processing By The First Component And The Second Component

Receiving A First Handoff Log Record, The First Handoff Log Record Being Generated By A Receiving Component That Is Instrumented For Logging Transaction Processes, The First Handoff Log Record Being Generated By The Receiving Component In Response To The Receiving Component Receiving A Handoff Of Transaction Processing Associated With A Transaction From A Caller Component That Is Not Instrumented For Generating Log Records

720

Determining That The Caller Component Is A Non-Logging Component In Response To Receiving The First Handoff Log Record From The Receiving Component

730

Recording The First Handoff Log Record In A Log Maintained In Persistent Storage To Reflect A Handoff Of The Transaction Processing From The Caller Component To The Receiving Component

810 — Instrumenting The Particular Component To Generate A First Processing Log Record For Transaction Processing Handled By The Particular Component

820 — Instrumenting The Particular Component To Generate A Handoff Log Record To Reflect A Handoff Of The Transaction Processing From The Particular Component To Any Subsequent Component Receiving The Transaction Processing From The Particular Component

830 — Instrumenting The Particular Component To Generate A Second Processing Log Record When It Is Determined That Said Any Subsequent Component Is A Non-Logging Component That Is Not Instrumented For Generating The Second Processing Log Record And To Refrain From Generating The Second Processing Log Record When It Is Determined That Said Any Subsequent Component Is A Logging Component That Is Instrumented For Generating The Second Processing Log Record

840 — Instrumenting The Particular Component To Generate An Additional Handoff Log Record Associated With The Particular Component Receiving A Handoff Of The Transaction Processing From A Preceding Component In Response To Determining That The Preceding Component Is A Non-Logging Component That Is Not Instrumented For Generating The Additional Handoff Log Record And To Refrain From Generating The Additional Handoff Log Record In Response To Determining That The Preceding Component Is A Logging Component That Is Instrumented For Generating The Additional Handoff Log Record

*Figure 8*

| Component | Value   | Meaning                                    |
|-----------|---------|--------------------------------------------|
| A         | N:0     | A is Processing Activity N                 |
| A         | N:1     | A is Passing Activity N to B               |
| A         | N:2     | A is Passing Activity N to D               |
| B         | N:1.0   | B is Accepting Activity N from A           |
| B         | N:1.1   | B is Passing Activity N to C               |
| C         | N:1.1.0 | C is Accepting Activity N From B           |
| C         | N:1.1.1 | C has Completed Processing of Activity N   |
| D         | N:2.0   | D is Accepting Activity N From A           |
| D         | N:2.1   | D has Completed Processing of Activity N   |

*Figure 10*

CORRELATION ACROSS NON-LOGGING COMPONENTS

CROSS-REFERENCE TO RELATED APPLICATIONS

This application is related to U.S. patent application Ser. No. 15/674,982 filed on Aug. 11, 2017, entitled "CORRELATION ACROSS NON-LOGGING COMPONENTS," which issued as U.S. Pat. No. 10,484,461 on Nov. 19, 2019.

This application is also related to co-pending U.S. patent application Ser. No. 15/675,050, filed on Aug. 11, 2017, entitled "CORRELATION ACROSS NON-LOGGING COMPONENTS."

All of the foregoing applications are expressly incorporated herein by reference in their entireties.

BACKGROUND

There are many types of computing systems, ranging from simple standalone devices to complex distributed networks, each of which includes one or more components configured to perform specialized processing on data objects being handled by the computing systems. For instance, some components are configured to detect and/or generate data signals. Others are configured to update and/or render visualizations associated with the data objects. Yet others are configured to perform a variety of different computing processes.

Some components generate records of the processes they perform, including the handling of the arrival and/or departure of the data objects they process. These records can be sent to a centralized system to reflect the flow and overall processing performed on an object. These records, which are sometimes referred to as log records, can be particularly helpful when an object is processed by a variety of different components in a complex transaction. For instance, when a transaction fails, it can be helpful to have a record of all transaction processing that was performed to identify which of the system components failed. Likewise, it can be helpful to examine a transaction log to analyze the flow of data objects through various system components in a distributed processing system in order to identify bottlenecks and other inefficiencies in the system.

To generate a log record, a component must first be instrumented with code that instructs the component how and when to generate the log record. A component that is configured to generate log records is referred to herein as an instrumented component and/or a logging component.

It will be noted, however, that some components are incapable of generating log records. For instance, many components cannot, or cannot easily, be instrumented with the logic to perform the registrations required for generating the log records. For example, the instrumentation library might be written in C and rely on the ability to open a network connection to the central logging facility, but a database might not be able to host arbitrary C code and/or user functions might not be allowed to open the network connections required to connect with the central logging facility. If a component is incapable of generating and/or registering a log record, it is referred to herein as a non-instrumented component and/or a non-logging component.

In networks that include instrumented and non-instrumented components, the consolidated log maintained by the central logging facility will only include log entries originating from the instrumented components. This is a problem because an incomplete log cannot provide a view into the entire transaction that is performed on an object, thereby making it difficult or impossible to examine and identify the flow, inefficiencies and problems that may have transpired in the transaction.

For at least the foregoing reasons, there is an ongoing need to provide improved techniques and systems for logging transaction processing in heterogeneous networks that include a combination of instrumented and non-instrumented components. That said, the subject matter claimed herein is not limited to any specific embodiments that are determined to solve any particular disadvantages or that operate only in environments such as those described above. Rather, this background is only provided to illustrate one exemplary technology area where some embodiments described herein may be practiced.

BRIEF SUMMARY

The disclosed embodiments include methods, systems and devices for logging transaction processing in heterogeneous networks that include a combination of instrumented and non-instrumented components.

In some embodiments, a heterogeneous network includes an instrumented component that is configured to generate impersonated log records for one or more non-instrumented components that are involved in a handoff of transaction processing with the instrumented component. The impersonated log records are consolidated with other log records that are generated by one or more instrumented components performing some of the transaction processing. A central logging system records the various log records in a composite log which reflects a complete flow of the transaction processing performed on the object, including the flow/processing through the non-instrumented component.

In some embodiments, a receiving component is an instrumented component that is configured for generating log records for transaction processing associated with a transaction that is processed by multiple components, including at least one component that is not instrumented for logging. In this embodiment, the receiving component receives a transaction to process from a particular upstream component. Thereafter, upon determining that the particular upstream component is a non-logging component which has not been instrumented for logging the transaction processes, the receiving component creates an initial passing off log record associated with passing off of the transaction processing from the non-logging component to the receiving component, or else, the receiving component refrains from creating the initial passing off log record upon determining that the particular upstream component is a logging component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a flow diagram of acts associated with methods for a logging system to receive and process log records.

FIG. 7 illustrates a flow diagram of acts associated with methods for a logging system to receive and process log records.

FIG. 8 illustrates a flow diagram of acts associated with methods for a computing system to instrument components for generating log records for one or more other components.

FIG. 10 illustrates a diagram of elements, including correlation vectors, associated with log records.

DETAILED DESCRIPTION

Figure 1:
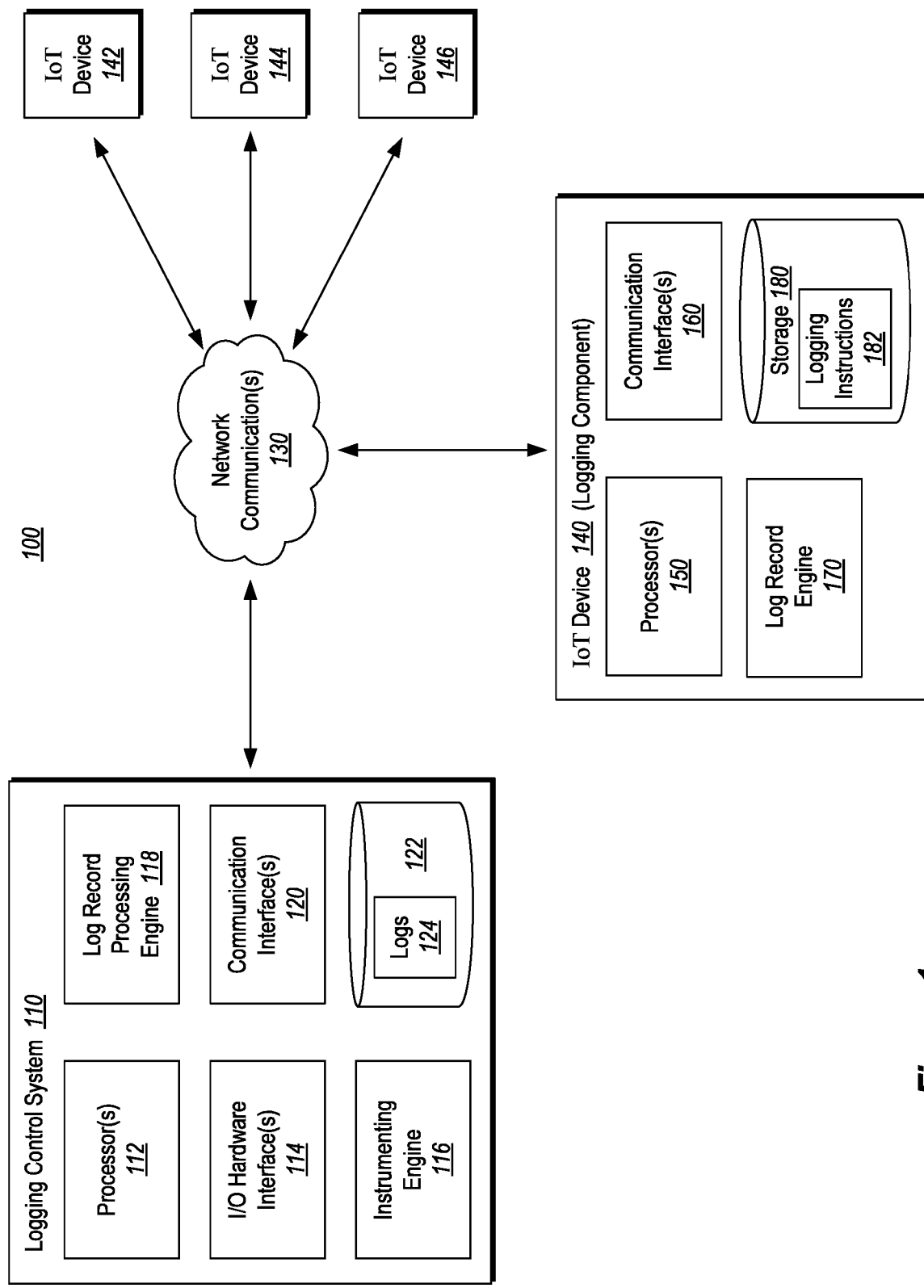
FIG. 1 illustrates an overview of a system that includes a logging control system, an instrumented logging component and one or more other components that are connected through one or more network connection(s).

The disclosed embodiments include methods, systems and devices for logging transaction processing in heterogeneous networks that include a combination of instrumented and non-instrumented components. The disclosed embodiments also include methods and systems for instrumenting components to perform logging of transaction processing and to, in some instances, generate impersonated log records for non-instrumented components involved in the transaction processing.

The term transaction and transaction processing broadly refer herein to one or more computer-executable processes that are performed with one or more related data objects. In many instances, the terms transaction and transaction processing corresponds to a group of operations that are performed by one or more computing components, in series and/or in parallel. During a handoff of the transaction/ transaction processing, one component completes its processing of the data object(s) and triggers another downstream component to begin performing processing of the data object(s) associated with the transaction.

In some embodiments, instrumented components are configured to generate impersonated log records for one or more upstream and/or downstream non-instrumented components that are involved in handoff transaction processing with the instrumented components. The impersonated log records are consolidated with other log records that are generated by one or more instrumented components performing some of the transaction processing. A central logging system stores the various log records in a composite log which reflects a complete flow of the transaction processing performed on the object, including the flow through the non-instrumented component(s).

A logging control computing system is configured for managing and logging records received from the instrumented components and to determine which components are non-instrumented. The control computing system is also configured to notify the instrumented components of the non-instrumented components and to instruct/instrument the logging components to generate log records for the non-instrumented components when receiving or handing of transaction processing to the non-instrumented components.

The ability to generate a composite log that reflects a complete flow of the transaction processing performed on the corresponding data objects of the transaction in a distributed network that includes one or more non-instrumented components is a technical improvement in the area of log generation and was not previously possible. Many benefits can be achieved, in some instances, by utilizing the disclosed embodiments to generate logs with impersonated log records that are created by instrumented components in behalf of non-instrumented components that are involved in transaction processing handoffs with the instrumented components. These benefits include the ability to generate a log that reflects a full flow of processing that is performed by a distributed network of components, including the non-instrumented components. The benefits also include the ability to instrument a logging component with the functionality to generate impersonated log records in behalf of non-instrumented components.

Attention will now be directed to FIG. 1, which illustrates a computing system 100 that includes a logging control system 110 connected to one or more networked devices, including logging component 140, and other connected devices 142, 144 and 146. While shown as standalone systems, it will be appreciated that each of the disclosed logging control system 110 and the disclosed devices/components 140, 142, 144, 146 can, alternatively, be configured as distributed systems that are connected through one or more of the network connections 130.

The logging component 140 and the other connected devices 142, 144 and 146 are examples of the recited 'components,' described herein. The term component should be broadly interpreted to be any computing device or system that includes a processor configured to process computer-executable instructions and a communication interface configured to enable the component to engage in a wireless or wired communication with another computing device or system. In some instances, the components are IoT devices (Internet of Things devices). In other instances, the components are more complex computing systems or devices, such as mobile phones, tablets or standalone computing devices. The components can also be, in some instances, different parts that are all integrated into a single computing device.

The network connections 130 include any combination of wired or wireless connections, such as, but not limited to Ethernet, cellular connections, or even computer to computer connections through serial, parallel, USB, or other connections. These connections allow the various computing systems/devices to access services at other computing systems and to quickly and efficiently receive application data from other computing systems/devices.

The network connections 130, together with the disclosed systems, may be referred to, herein, as "cloud" computing systems. In this description, "cloud computing" may be any combination of systems or resources for enabling ubiquitous, convenient, on-demand network access to a shared pool of configurable computing resources (e.g., networks, servers, storage, applications, services, etc.) that can be provisioned and released with reduced management effort or service provider interaction, such as under the control of the logging control system. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The logging control system 110 is configured to manage logging of the log records 124 in storage 122. The storage 122 may include any number of separate logs 124 corresponding to different transactions and objects. In this regard, the granularity of each log may be the same or vary. The storage 122 also stores, in some instances, a log that includes a correlation vector for a particular transaction or object being processed. The log may also include multiple log records that each have their own correlation vector. The correlation vector, which reflects the processing path of transaction activities will be described in more detail below in reference to FIGS. 10 and 11.

The storage 122 may include any combination of persistent and/or volatile storage, which may be local, remote and/or distributed.

The logging control system 110 includes one or more processors 112, which include hardware processors configured to execute computer-executable instructions stored in the storage 122. The one or more processors comprise, in some instances, means for processing stored computer-executable instructions that are executable for causing the logging control computing system 110 to perform the disclosed methods for logging activities performed by multiple components involved in a transaction.

The logging control system 110 also includes I/O hardware interfaces 110 and communication interfaces 120. These interfaces include input and output hardware and software user interfaces to facilitate user interaction and communication with the device(s)/system(s) connected to the logging control system 110. The hardware and communication interfaces may include, for example, a keyboard, mouse, touchpad, camera, etc. for allowing a user to input data into the computer. In addition, various software user interfaces may also be available. Examples of software user interfaces include graphical user interfaces, text command line based user interface, function key or hot key user interfaces, gesture detection software, and the like. Examples of hardware output devices include display devices, speakers and haptic feedback devices.

As illustrated, the logging control system 110 also includes a log record processing engine 118 which is configured to receive, analyze and process log records and to store the log records in appropriate logs 124 in the storage 122. The log record processing engine, alone and/or with the processor(s) 112, comprises means for receiving the log records. The log record processing engine with the processor(s) 112 and/or the storage 122 also comprise the means for causing the logging control computing system to perform the disclosed methods for logging activities performed by multiple components involved in a transaction and for storing the log records in persistent memory. The log record processing engine also includes, with or without the processor(s) 112, means for determining when a log record generated by a logging component is generated for a non-logging component.

The logging control system 110 also includes an instrumenting engine 116 that is configured to instrument components for generating log records for their own processing and, in some instances, for non-instrumented components. The instrumenting engine, alone and/or with the processor(s) 112, comprises means for causing the logging component to generate the disclosed handoff log record for the non-logging component in response to the non-logging component handing off transaction processing to the logging component and to generate the disclosed processing log record for the non-logging component in response to handing off the transaction processing to the non-logging component.

The instrumenting engine 116 obtains logging instructions for instrumenting the logging component(s) from storage 122 and/or from a remote third party. Then, when the instrumenting engine 116 is in communication with the logging component(s), the instrumenting engine 116 transmits the logging instructions and other related information to the logging component(s). The logging control system 110 is configured to communicate with one or more component(s) involved in the transaction processing, including a combination of instrumented and, in some instances, non-instrumented components, through one or more network communication links 130.

As will be appreciated from the foregoing, the logging control system 110 includes means for processing stored computer-executable instructions that are executable by the one or more processor(s) 112 for causing the logging control computing system 110 to perform a method for logging activities performed by multiple components involved in a transaction. These means for processing, as described above, include the one or more processor(s) 112, the log record processing engine 118 and the storage 122. For instance, the logging control system includes means for instrumenting the components to generate log records (such as instrumenting engine 116). In some instances, the means for instrumenting is described as means for causing a logging component to generate a handoff log record for a non-logging component in response to the non-logging component handing off transaction processing to the logging component and to generate a processing log record for the non-logging component in response to handing off the transaction processing to the non-logging component.

The logging control system also includes means for receiving log records (such as the communication interface (s) 120 and the log record processing engine 118) and means for storing the log records in persistent memory (including the processor(s) and the storage 122). The logging control system also includes means for determining when a log record generated by a logging component is generated for a non-logging component (such as log record processing engine 118).

As shown in FIG. 1, the logging control system 110 is in communication with at least one component that is instrumented for logging. In some instances, the logging control system 110 instrumented the logging component to generate one or more log records, as described herein, for itself and for one or more non-instrumented components.

Logging component device 140 is an example of a component that has been instrumented for logging. As shown, the logging component device 140 includes one or more processor(s) 150 and storage 180. The storage 180, which includes persistent and/or volatile storage, stores the logging instructions that instruct the logging component device 140 when and how to generate and register log records with the logging control system 110. The logging instructions 182 may also include protocol instructions that specify the different value and naming conventions for data fields to include in a log record, such as the values identified in the table of FIG. 10, which will be discussed later. The logging instructions may also include notifications and/or indices that identify which other components (142, 144, 146) are non-instrumented components.

The logging component device 140 also includes a log record engine 170 which is configured to generate the log records and to register the log records with the logging control system 110, as instructed from the logging instructions maintained in the storage 180. The logging component 140 may also store the log records in the storage 180 prior to sending the log records to the logging control system, such that the log records can be sent at any desired/appropriate time and in response to different triggering events (e.g., periodic intervals, in response to a request, in response to enqueuing a predetermined number of log records, etc.). In some instances, the logging component 140 batches a plurality of log records prior to transmitting the batch of log records to the logging control system 110.

The logging component device 110 also includes one or more communication interface(s) for communicating with the logging control system and the one or more other components in communication with the logging component device 140, such as devices 142, 144 and/or 146.

Each of the illustrated devices 142, 144 and 146 are configured, in some instances, to include at least some of the elements described in reference to logging component device 140, such as processors, communication interfaces and storage. In some instances, one or more of the illustrated devices 142, 144 and 146 omit, however, the logging instructions and/or the log record engine. In such instances, the corresponding device(s) will be configured as non-instrumented components that are not configured for generating and/or registering log records with the logging control system 110.

It will be appreciated that although the devices 140, 142, 144 and 146 are illustrated as comprising IoT devices, it is not necessary that these devices be characterized this way. In some instances, for example, one or more of the devices are not IoT devices. Any combination of these devices 140, 142, 144 and 146 (as well as one or more other similar devices) are utilized to perform a transaction on one or more data objects.

Some of the devices are configured as instrumented components (such as instrumented component device 140) to generate log records associated with their transaction processing to reflect the flow and/or processing performed on the data objects. According to some of the disclosed embodiments, the log records that are generated also include at least one or more impersonated log records that are created by instrumented component(s) for non-instrumented component(s) to reflect the handling and/or processing of the data object(s) by the non-instrumented component(s), as described herein.

The following discussion will now refer to a number of methods and method acts that may be performed during implementation of some of the disclosed embodiments. Although the method acts may be discussed in a certain order or illustrated in a flow chart as occurring in a particular order, no particular ordering is required unless specifically stated, or required because an act is dependent on another act being completed prior to the act being performed.

Figure 2:
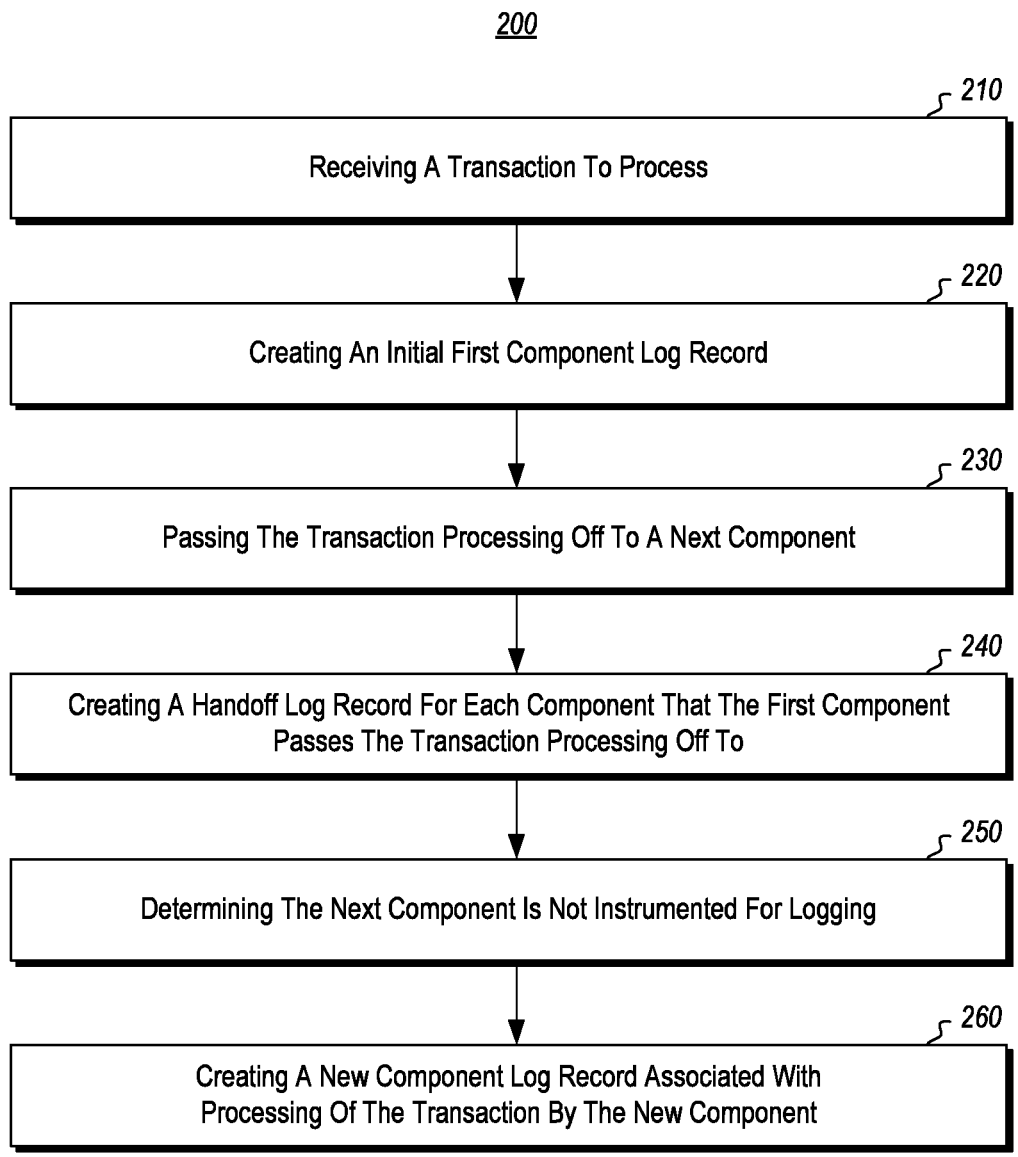
FIG. 2 illustrates a flow diagram of acts associated with methods for an instrumented component to create a log record for another component.

FIG. 2 illustrates a flow diagram 200 of acts associated with methods for an instrumented component, such as logging component 140, to create and/or register a log record for a downstream non-instrumented component. In such embodiments, the instrumented component includes one or more processors and stored computer-executable instructions which are executed by or executable by the one or more processors to implement the disclosed methods.

As shown, the acts include the logging component receiving a transaction to process (act 210). This transaction can include any transaction processing associated with a particular transaction that is being performed by a plurality of different components, including at least one non-instrumented component. The transaction processing can include any data operation that is performed on an object associated with the transaction, including any data structures, files, threads, etc. In some embodiments, the data operation is merely handling of the transaction process, such as accepting and/or handing the transaction process off to another component. In some embodiments, the data operation includes modifying a data object, creating a new data object and/or deleting a data object associated with the transaction.

Each of the different components are configured with special functionality to perform different processing on data objects as part of the transaction processing that is passed through a processing pipeline that includes the various components. However, in some embodiments, the different components can also perform similar or the same processes on the data objects as part of the transaction processing.

In response to performing the transaction processing, the logging component is configured to create an initial first component log record that reflects the transaction processing (act 220). Next, the logging component passes the transaction processing off to a next component (act 230). In some instance, the transaction processing is passed off to another component that is specified in a pre-established processing pipeline and/or in response to dynamic instructions included with the object. The transaction processing can also be handed off in response to dynamic instructions received from the logging control system or another component, based on attributes of the object or other triggering events.

When the logging component passes off the transaction processing, it creates a handoff log record for the next component that the transaction processing is passed off to (act 240). If the transaction processing is handed off to multiple different components, a separate log record with unique identification is created for each of the different components receiving the transaction processing.

In some instances, the transaction processing is handed off to another component that is not instrumented for logging. In these instances, the logging component determines that the receiving component is not instrumented for logging (act 250). This determination can be made by referencing a stored table or index at the logging component that identifies the components that are not instrumented for logging. Alternatively, the logging component can query the receiving component and/or the logging control system for logging capabilities of the receiving component. Upon failing to receive a positive reply to the query about logging capabilities, the logging component can determine that the receiving component is not instrumented for logging. The logging component can also receive a notification from a remote system (e.g., the logging control system, or another device or system than the particular receiving component) that the particular receiving component is a non-logging component.

Then, upon determining the receiving component is not instrumented for logging, the logging component creates a new component log record associated with the transaction processing being performed by the receiving component (act 260).

The log records created by the logging component are sent to the logging control system for persistent storage. All of the log records are sent on demand, according to a predetermined schedule, when batched into a plurality of log records (to improve efficiencies) and/or automatically in response to being created. Instructions for the manner in which the log records are created and the conditions/timing for sending the log records are specified in the logging instructions that are stored by and/or that are accessible to the logging component.

In some instances, the disclosed flow of FIG. 2 also includes the logging component creating a secondary first component log record associated with passing the transaction processing off to the next component, to reflect a reception of the transaction processing by the next component, wherein the secondary first component log record is a unique log record having a unique incremented component value that distinguishes the secondary log record from at least one other secondary log record associated with passing the transaction processing off to a different next component.

In some instances, the new component log record that was created also includes the transaction ID and the incremented component value, as well as a new extension component value that corresponds to the transaction processing by the new component, since the new component is a non-logging/non-instrumented component that is incapable of generating/registering a similar log record to show the processing being performed by the new downstream component.

Figure 3:
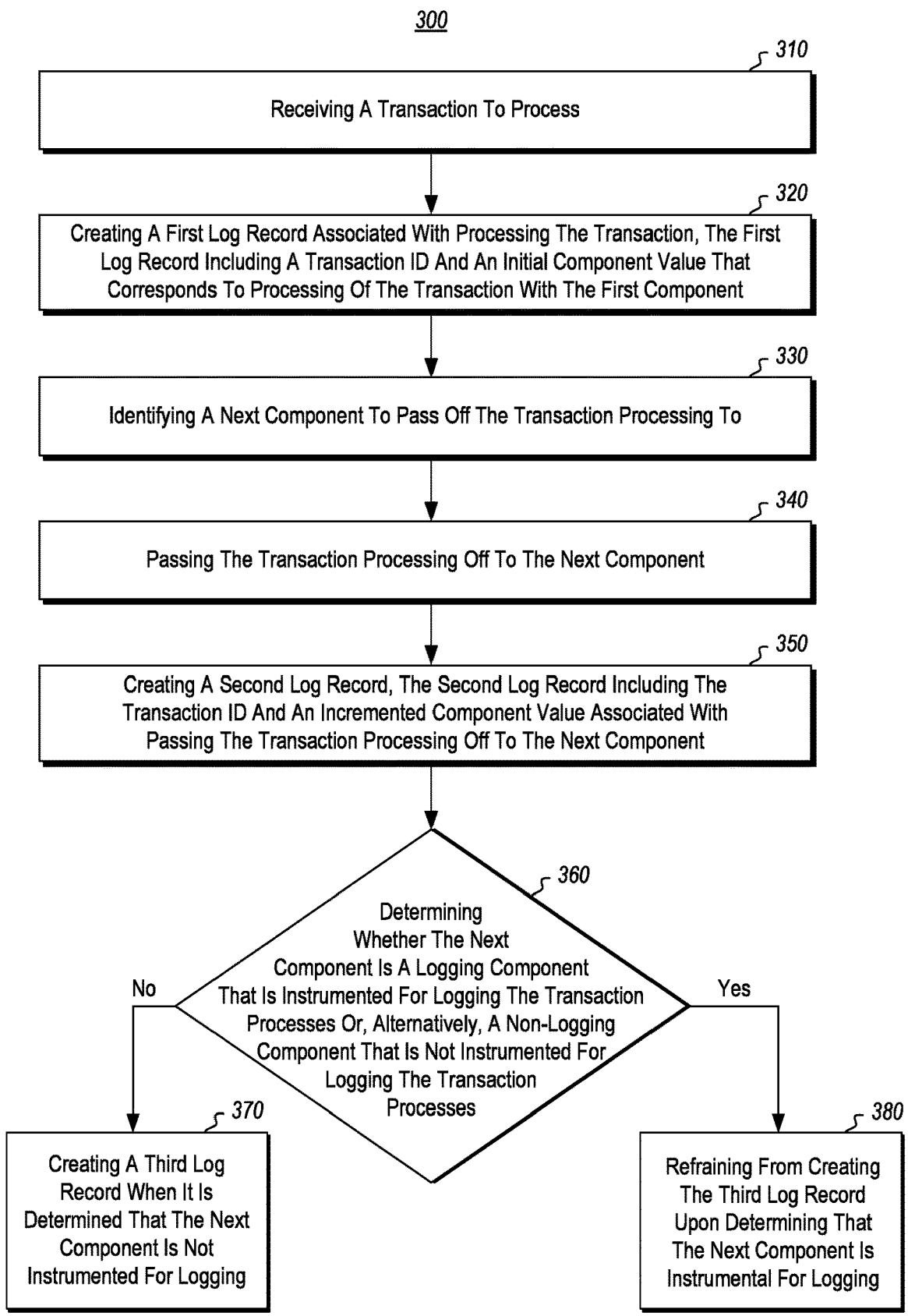
FIG. 3 illustrates a flow diagram of acts associated with methods for an instrumented component to create or refrain from creating log records for downstream components depending on whether or not the downstream components are instrumented components.

FIG. 3 illustrates a flow diagram 300 of acts associated with related methods for an instrumented component, such as logging component 140, to create or refrain from creating log records for downstream components depending on whether or not the downstream components are instrumented components. In such embodiments, the instrumented component includes one or more processors and stored computer-executable instructions which are executed by or executable by the one or more processors to implement the disclosed methods.

As illustrated, the instrumented component first receives a transaction to process, which may include any portion of transaction processing associated with the transaction (act 310). Next, a first log record is created by the instrumented component to reflect the transaction processing (act 320). This first log record includes, according to some embodiments, a transaction ID (identifier) and an initial component value corresponding to the instrumented component.

Next, the instrumented component identifies a next component to pass of the transaction processing to (act 330). This may be specified by the previous component, by an established processing pipeline, by the object(s) being processed, by a remote system and/or in response to stored instructions.

Once the transaction processing is passed off or handed off to the next component (act 340), the instrumented component creates a second log record to reflect the handing off of the transaction processing. When the transaction processing is handed off to multiple different downstream components, the instrumented component creates a separate 'second log' record for each hand-off.

The second log record includes the transaction ID and an incremented component value associated with the handing off or passing off of the transaction processing. When the transaction processing is handed off to multiple downstream components, a separate 'second' log record for each downstream component will be created as a unique log record having a unique incremented component value. This protocol structure for the log records will be described in more detail with reference to FIGS. 10 and 11.

Next, a determination is made whether the next 'downstream' component is a logging/instrumented component or not, such as, for example, by receiving a notification from a remote system other than the new component that the new component is a non-logging component.

If a determination is made that the downstream component is not instrumented for logging, the instrumented component will create a third log record, which is an impersonated log record, to reflect the transaction processing by the new downstream component that is not instrumented for logging. Otherwise, if it is determined that the new component is capable of logging, then the instrumented component refrains from creating the third log record.

The third log record will include the transaction ID, the incremented component value and (for each new component receiving the handoff) a new extension component value that corresponds to processing of the transaction with the new component (such that each third log record will be unique). This protocol structure for the log records will be described in more detail with reference to FIGS. 10 and 11.

Figure 4:
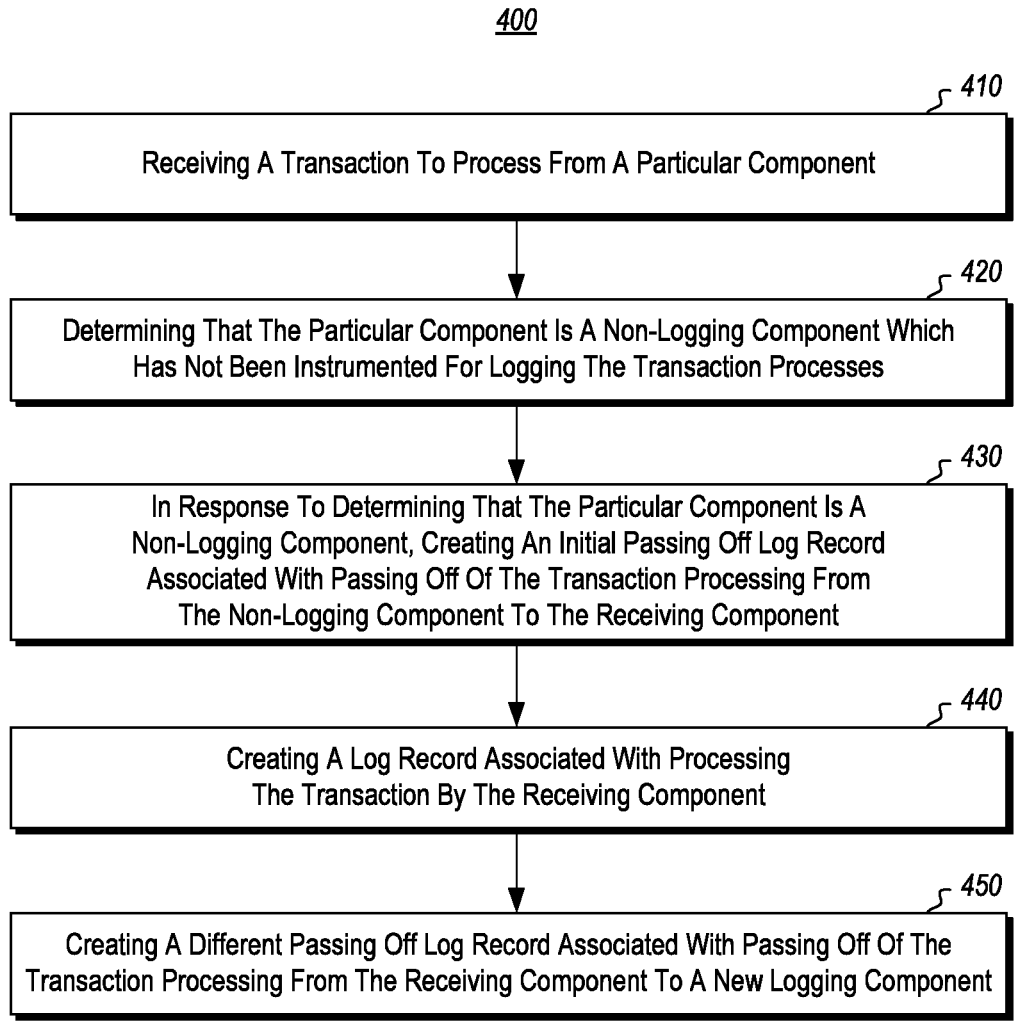
FIG. 4 illustrates a flow diagram of acts associated with methods for an instrumented component to create or refrain from creating log records for a non-logging upstream component.

FIG. 4 illustrates a flow diagram 400 of acts associated with methods for an instrumented component to create or refrain from creating log records for a non-logging upstream component. In such embodiments, the instrumented component includes one or more processors and stored computer-executable instructions which are executed by or executable by the one or more processors to implement the disclosed methods.

As illustrated an instrumented component first receives a transaction to process from a particular upstream component (act 410). Then, upon determining that the particular upstream component is a non-logging component which has not been instrumented for logging the transaction processes (act 420), the instrumented component creates an initial passing off log record associated with handing off or passing off of the transaction processing from the upstream non-logging component to the receiving component (act 430).

The determining act can be performed using any of the techniques described above in reference to FIGS. 2 and 3, including receiving a notification from a logging control system, from a third party, examining stored index values, etc.

Each log record that is created by the instrumented component is sent to the logging control system for persistent storage with other transaction log records associated with the transaction being processed. The instrumented component may also optionally store the log record(s) until a predetermined time or condition, such as to batch log records and/or to only provide the log records when requested by the logging control system. Alternatively, the log records may be transmitted automatically as they are created.

Subsequently, once the instrumented component processes and hands-off the transaction processing to one or more downstream components, the instrumented component will create a log record for the processing and one or more log records for handing off the transaction processing, as described previously, and which may include generating impersonated reception and processing log records for downstream non-instrumented components.

Figure 5:
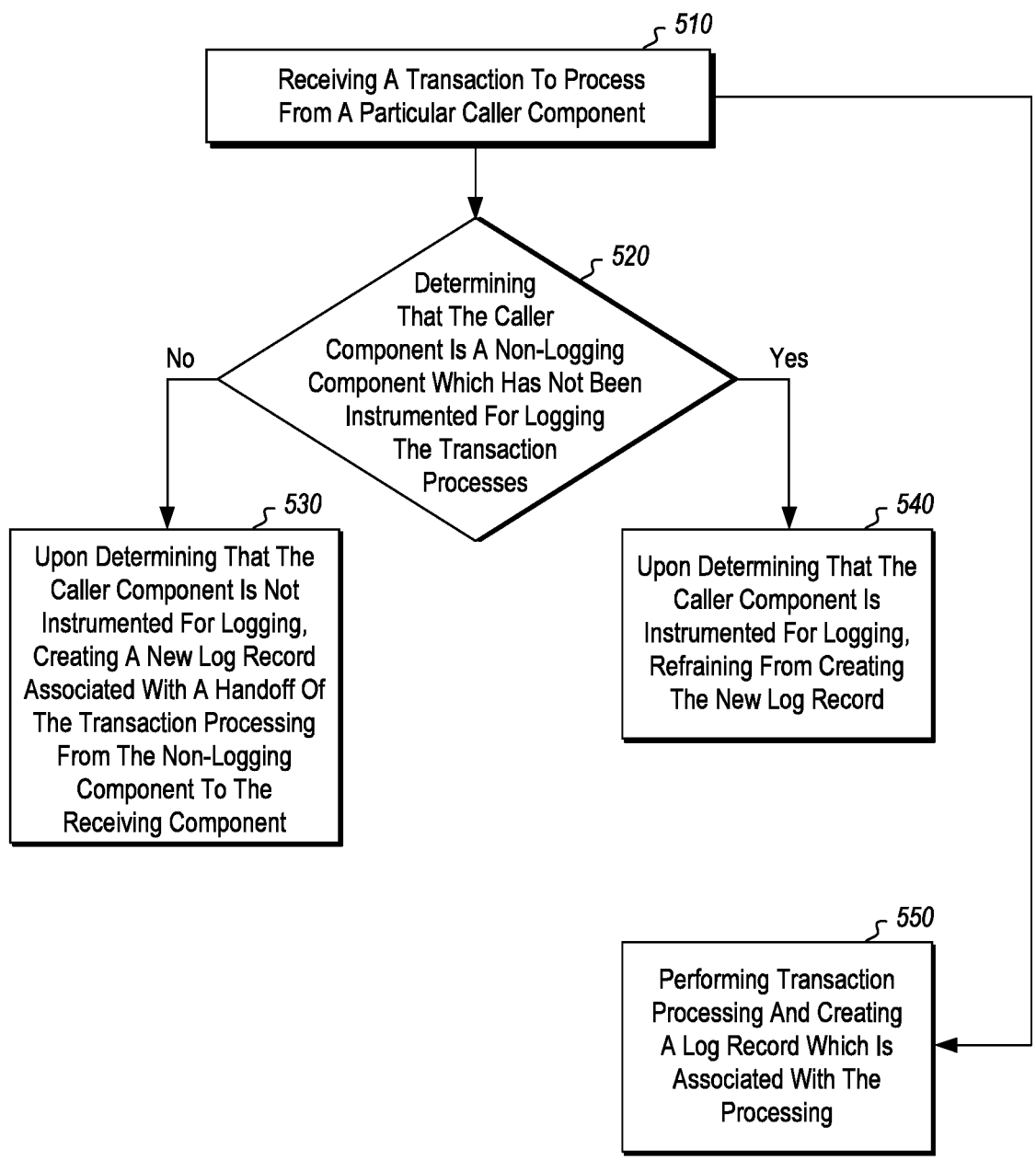
FIG. 5 illustrates a flow diagram of acts associated with methods for an instrumented component to create or refrain from creating log records for upstream components depending on whether or not the upstream components are instrumented components.

FIG. 5 illustrates a flow diagram 500 of acts associated with related methods for an instrumented component to create or refrain from creating log records for upstream components depending on whether or not the upstream components are instrumented components. In such embodiments, the instrumented component includes one or more processors and stored computer-executable instructions which are executed by or executable by the one or more processors to implement the disclosed methods.

As shown, the instrumented component (referred to in this embodiment as a receiver component) receives a handoff of a transaction (i.e., transaction processing) from a particular upstream component (referred to in this embodiment as a caller component) (act 510). Then, a determination is made as to whether the upstream caller component has been instrumented as a logging component or not (act 520). This determination can be made, as described previously, based on information that is stored at the instrumented component or that is received from a remote system, such as the logging control system.

Upon determining the caller component is not instrumented for logging, the instrumented receiver component creates a new log record associated with a handoff of the transaction processing from the non-logging caller component to the instrumented receiver component (act 530). Alternatively, upon determining that the upstream caller component is instrumented for logging, the instrumented receiver component will refrain from creating the impersonated new log record to reflect the handoff from the caller component (act 540).

The instrumented receiver component will also create a processing log record to reflect processing of the transaction by the receiver component (act 550). Likewise, when the transaction processing is subsequently handed off to another downstream component, the receiver component will create one or more passing off log records to reflect this subsequent handoff and one or more processing log records, if appropriate, for receiving non-instrumented components, as previously described.

FIG. 6 illustrates a flow diagram 600 of acts associated with methods for a logging control system to receive and process log records. In such embodiments, the logging control system includes one or more processors and stored computer-executable instructions which are executed by or executable by the one or more processors to implement the disclosed methods.

As reflected, the logging control system receives a first component log record that is generated by a 'first' instrumented component (act 610). This first component log record was generated by the first component, as described above, in response to handling or otherwise performing some of the transaction processing of a particular transaction. In some instances, the logging control system will receive multiple log records from the first component, one for accepting the handoff of transaction processing, one for performing the transaction processing and one for handing off the transaction processing.

In some instances, as reflected in act 620, the logging control system will also receive an impersonated information log record associated with handling of the transaction processing by a second component which is not instrumented for logging and which received the transaction processing from the instrumented component (act 620). This impersonated information log record was generated by the first component rather than from the second component in response to a determination being made that the second component is a non-instrumented component.

In some instances, the logging control system also notifies/instructs the first component to generate the impersonated information log record for the second component and any other non-logging components that the first component hands off the transaction processing to. The logging control system also, in some instances, notifies the first component that the second component is a non-logging component. This set of instructions may occur during a single instrumenting of the first component. Alternatively, the instructions/notifications may be received over time through a series of different communications. For instance, the logging control system may perform an initial instrumenting of the first component with instructions for generating log records and to provide protocol information necessary for generating the log records. The logging control system may then later update the protocol information, the instructions and/or an index of non-instrumented components.

In some instances, the logging control system also receives a handoff log record from the first component, subsequent to receiving the first component log record and prior to receiving the impersonated information log record. Such a handoff log record would be generated, for example, by the first component to reflect handing off of the transaction processing to the second component.

The logging control computing system may also receive a subsequent handoff log record that is generated by a third component that receives a handoff of the transaction processing from the second component, the subsequent handoff log record will correspond to the second component's handing off the transaction processing to the third component. In such an embodiment, the logging control computing system may also receive a new log record generated by the third component that corresponds with the third component performing the transaction processing at the third component. This third log record will include an appropriate transaction ID, an incremented component value and a unique extension component value that corresponds to processing of the transaction with the third component, as described in more detail below in reference to FIGS. 10 and 11.

The logging control system may also receive an additional log record for each different component that the first component passes the transaction processing off to, wherein each additional log record is a unique log record having a unique incremented component value.

Once the logging control system receives any/all of the log records, the logging control system stores the log records in persistent storage to reflect the flow and processing/handling of the transaction processing by the first and second components (act 630), and any other components involved in the processing of the transaction, even without receiving an action log record from the second 'non-instrumented' component or any other non-instrumented component. This is an improvement over existing systems that are not configured to receive/record log records for non-instrumented components and which would otherwise create incomplete transaction logs for distributed networks that include one or more non-instrumented components.

FIG. 7 illustrates a flow diagram 700 of acts associated with related methods for a logging control system to receive and process log records. In such embodiments, the logging control system includes one or more processors and stored computer-executable instructions which are executed by or executable by the one or more processors to implement the disclosed methods.

As reflected, the logging control system receives a handoff log record that was generated by a receiving component that is instrumented for logging transaction processes (act 710). Notably, this handoff log record was generated by the receiving component in response to receiving the handoff of the transaction processing from an upstream caller component that was not instrumented for generating log records. The handoff log record would normally be generated by the caller component, but wasn't. In this regard, the handoff log record is an impersonated log record.

In some instances, the handoff log record is based on a stored log record that includes a transaction ID and an initial component value associated with a previous component that passed the transaction processing off to the caller non-logging component. In such instances, the handoff log record includes the transaction ID and an incremented component value that corresponds to the transaction processing being passed off by the caller non-logging component.

The logging control system determines that the caller component is a non-logging component (act 720). This determination may be made in response to receiving the handoff log record from the receiving component, rather than from the caller component. For instance, this determination can be made by examining the log record for data that reflects that the log record is for a handoff from the caller component (e.g., the incremented component value), even though the caller component is not submitting the log record. Alternatively, or additionally, the logging control system can verify that the caller component is a non-instrumented component by referencing stored indexes that reflect which components are instrumented.

The foregoing determination can be useful, particularly for scenarios in which the caller component was previously instrumented for logging, but is failing to generate appropriate log records for some reason, the logging control system can update the indexes to reflect that the caller component is a non-instrumented component. In such instances, the logging control system can notify other instrumented components that the caller component is a non-logging component.

Once the logging control system receives the log records, the logging control system stores the log records in persistent storage to reflect the flow and processing/handling of the transaction processing by the various components (act 730). As described, above, in reference to FIG. 7, the logging control system may also receive other types of log records as well, which are also stored in the persistent storage to reflect a complete flow/handling of a transaction by the various components of a distributed heterogeneous network that includes at least some non-instrumented components. The logging control system may also append or modify the log to reflect which of the components are not instrumented for logging.

Some of the additional log records that may be received and stored by the logging control system include: a subsequent handoff log record associated with handing off of the transaction processing from the receiving component to a new logging component; a new log record associated with the transaction processing at the receiving component prior to the subsequent handoff log record; a transaction processing log record associated with processing of the transaction by the receiving component, the transaction processing log record being generated by the receiving component and including the transaction ID, the incremented component value and a new extension component value that is associated with the receiving component; and a new handoff log record associated with handing off of the transaction processing from the receiving component to a new logging component and which includes the transaction ID, the incremented component value and new value that increments and is based on the new extension component value. These log records are described in more detail in reference to FIGS. 10 and 11.

Attention is now directed to FIG. 8, which illustrates a flow diagram 800 of acts associated with methods for a logging control system to instrument components for generating log records in a heterogeneous network that includes at least one component that is not configured to generate log records. In such embodiments, the logging control system includes one or more processors and stored computer-executable instructions which are executed by or executable by the one or more processors to implement the disclosed methods.

As reflected, the logging control system instruments one or more components to generate log records. This includes instrumenting a particular component to generate a first processing log record for transaction processing handled by the particular component (act 810). This is accomplished by providing the particular component with code for generating the log record in a single transmission and/or through multiple transmissions, when the particular component is connected to the logging control system with one or more network connections. The code provides the particular component with the necessary instructions for generating the log record, as well as information for the protocol to use to generate the log records and the instructions for timing and conditions to use for sending the log records to the logging control system. Sometimes, the information provided to the component(s) during instrumentation also includes an index or listing of components that are non-instrumented in the network.

In some instances, the logging control system instruments the particular component to generate the first processing log record with a transaction ID, an incremented component value and a unique extension component value that corresponds to processing of the transaction with the particular component. The transaction ID can be obtained from the logging control system or an object being operated on during processing of the transaction. The incremented component value can be an integer and the unique extension component value can also be an integer. The protocol for generating this and other log records is described in more detail, below, with reference to FIGS. 10 and 11.

The code and information provided to the component during instrumenting can also include additional instructions and information that are necessary for the component(s) to generate the other log records described herein, including the log records referenced in acts 820, 830 and 840.

In some embodiments, the logging control system instruments the particular component to generate a handoff log record to reflect a handoff of the transaction processing from the particular component to any subsequent component receiving the transaction processing from the particular component (act 820). The particular component is also instrumented to generate a handoff log record for each subsequent component that the particular component passes the transaction processing off to, with each handoff record comprising a unique log record having a unique incremented component value.

The logging control system also instruments, in some embodiments, the particular component to generate a second processing log record when it is determined that said any subsequent component is a non-logging component that is not instrumented for generating the second processing log record and to refrain from generating the second processing log record when it is determined that said any subsequent component is a logging component that is instrumented for generating the second processing log record (act 830).

In some embodiments, the logging control system also instruments the particular component to generate an additional handoff log record associated with the particular component receiving a handoff of the transaction processing from a preceding component in response to determining that the preceding component is a non-logging component that is not instrumented for generating the additional handoff log record and to refrain from generating the additional handoff log record in response to determining that the preceding component is a logging component that is instrumented for generating the additional handoff log record (act 840). This additional handoff log record is based on a stored log record that includes a transaction ID and an initial component value associated with a preceding component that passed the transaction processing off to the preceding component, the additional handoff log record including the transaction ID and an incremented component value that corresponds to the transaction processing being passed off by the preceding non-logging component.

Figure 9:
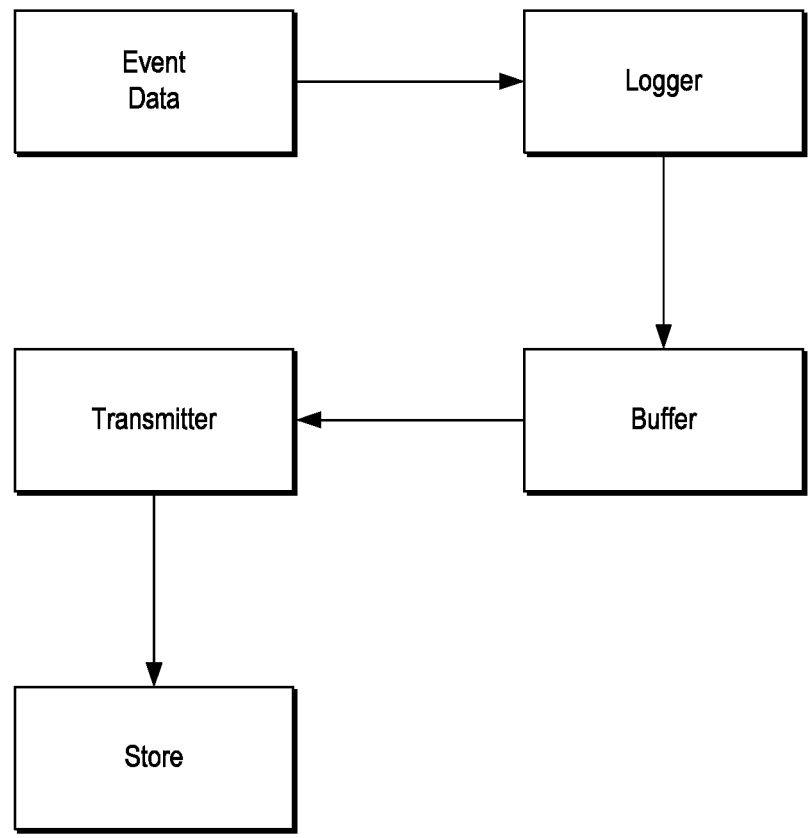
FIG. 9 illustrates a flow diagram associated with generating and logging transaction processes and that reflects a flow of data through the generating and logging processes.

Attention is now directed to FIG. 9, which illustrates a flow of event data/objects as they flow through the overall system during implementation of some of the disclosed methods. As shown, event data objects will pass through a logger (e.g., the component processing the object) which generates a log record for the object that is buffered until it is transmitted to a repository system, such as the logging control system, for storage.

Each event object, for which a log record is created during handling, can be referred to as an EventData object and is configured with various properties, including an event name. The EventData object can also include other properties such as a time stamp to reflect process/handling timing or sequences.

The EventData object will also include information identifying the logging component (e.g., component handling the object), as well as information identifying components passing the object to the logging component or receiving the object from the logging component. The EventData object can also be configured to store error information and a correlation vector appended to the object. The correlation vector and/or the other EventData properties can be used to illustrate an objects path through a processing pipeline that includes multiple components, including at least some components that are not instrumented for logging and/or for updating the correlation vector.

In some instances, the correlation vector comprises an activity ID substring (e.g., 'name' and 'number sequence'), followed by a vector clock substring indicating the previous path of activity for the object. Examples of vector clock substrings are provided in the value column of the table in FIG. 10. The correlation vector can be appended to the object being processed, added to a log record and/or be a stored data structure that is updated at the logging control system to reflect the object processing path.

Figure 11:
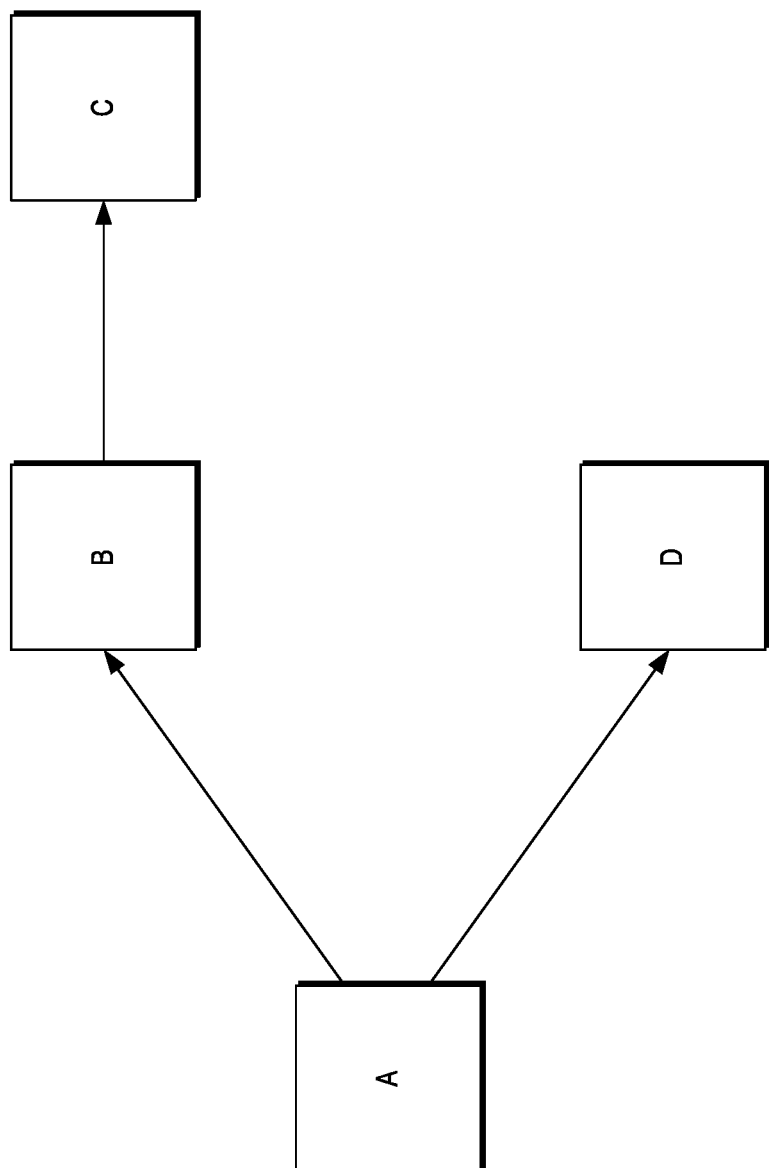
FIG. 11 illustrates a diagram of a distributed network that includes a plurality of different components that generate log records having the correlation vectors reflected in the table of FIG. 10.

The table of FIG. 10 illustrates several correlation vectors that will be generated to reflect the processing and handling of objects during the processing of a transaction across the components illustrated in FIG. 11. For instance, the transaction processing illustrated in FIG. 11, and referenced in FIG. 10, includes component A performing transaction processing for a particular transaction, referred to as activity N. Then, component A passes off the transaction processing (activity N) to components B and D. Likewise component B passes of the transaction processing to component C.

As shown in FIG. 10, the vector correlations include the name of the transaction processing or transaction ID (e.g., activity 'N') followed by a vector clock substring that reflects the processing/handling path of the activity/object. For instance, when component A processes activity N, it will generate a log record that includes vector correlation N:0, reflecting a first processing of the activity/object, with a transaction ID of N and an initial component value of 0. Then, when the transaction processing is passed to component B, a new log record is generated with vector correlation N:1, which includes the transaction ID of N and a unique incremented component value associated with the handoff. Next, when the transaction processing is passed to component D, the vector correlation for that log record will include the transaction ID (i.e., N) followed by a new unique incremented component value of 2. For each additional component that component A hands activity/object N off to will cause the generation of a new correlation vector and, sometimes a corresponding log record that is unique, with a unique incremented component value, such as can be created by continually incrementing the incremented component value for each new receiving component.

When a receiving component accepts the transaction processing, such as when component D accepts the transaction processing from A, the correlation vector will be updated and/or a log record will be created with the updated correlation vector to reflect this. In the current embodiment, this is reflected by updating the vector correlation to N:2:0, which indicates the path of activity N from component A, which handed activity N off to component D (shown in third row as N:2), and which has been accepted by component D, reflected by component D adding an extension ('0') to the vector correlation ('0').

When component D subsequently performs a process or completes the process on activity/object N, it will update the correlation vector and create a log with the updated correlation vector that has an incremented extension component value. If D thereafter passes the activity off to another component, it will also increment the extension component value to reflect this, such as by logging/updating a log record with correlation vector N:2:2 (not shown). When the new component accepts the activity N from component D, it will also create a new log record with an updated correlation vector that has a new extension (N:2:2:0—not shown in FIG. 10). A related example of this in the table of FIG. 10 is illustrated by the correlation vector N:1:1:0, which reflects that component C has accepted activity N from component B.

Accordingly, each time a component performs a transaction process on an activity or object associated with a transaction it will increment the incremented component value associated with the component in the correlation vector. This includes processes performed by the component, such as performing an operation on the object/activity and passing the activity/object on to another component.

Then, each time a component accepts an activity/object associated with the transaction, the correlation vector is extended with a new extension component value. However, that new extension component value becomes an incremented component value for that component and is incremented for each activity performed. In this manner, a new value field is added to the correlation vector each time the activity/transaction processing is accepted by a new component and the value in that new value field is incremented each time a process is performed on the activity/transaction processing by the component associated with that value field.

Although not required, the different incremented component values/extension component values of the vector correlation can be separated by a period or other separator. This can be helpful when the values are integers and there are more than nine processes performed, such that the value will be at least a double digit value.

The foregoing process for creating/modifying the correlation vector will be iterated until the transaction is complete. Each time the correlation vector is changed, a new log record with the correlation vector is created and sent to the logging control system for persistent storage. Alternatively, the correlation vector is simply updated in a data structure appended to the object/event/activity that is flowing through the transaction processing pipeline and/or a data structure maintained by the logging control system is updated to reflect the latest changes to the correlation vector, based on the log records or other data received from the logging components. Either way, it is possible to identify the entire flow of the transaction processing by reviewing the correlation vector that is associated with the last log and/or that is appended to the transaction element(s) and/or that is maintained by the logging control system.

Unfortunately, as described earlier, some components are not instrumented for logging and/or are unable to perform the modifications to the correlation vector. In these instances, the current embodiments include having the adjacent component (which is configured for logging) generate a log record (or modify the correlation vector) for the non-logging component. For instance, a logging component will be made aware when it receives transaction processing from a non-logging component or passes off the transaction processing to a non-logging component. Then, when this occurs, the logging component will generate the corresponding log record that the non-logging component would have created if it were a logging component.

By way of example, when a logging component passes off transaction processing to a non-logging component, the logging component will generate a log record of the non-logging component accepting the transaction processing, in addition to its own log record for handing off the processing. Sometimes, the logging component can also generate a separate log to reflect the non-logging component processing the transaction processing. For instance, in regard to FIGS. 10 and 11, if component B were a non-logging component and component A were a logging component, then component A would generate the log entry having correlation vector N:1:0. If component D were a non-logging entity too, then component A could also generate the log entries having correlation vectors N:2:0 and N:2:1.

By way of another example, when a logging component receives a handoff of transaction processing from a non-logging component, the logging component will generate an impersonated log record reflecting the handoff by the non-logging component, separate from its own log record for accepting the handoff. The logging component could also generate a log record reflecting the processing performed by the non-logging component. For instance, in regard to FIGS. 10 and 11, if component B were a non-logging component and component C were a logging component, then component C would generate the log entry having correlation vector N:1:1.

As described herein, the embodiments of the present invention may comprise or utilize a special purpose or general-purpose computer including computer hardware, including physical computer-readable storage devices and other computer-readable media for carrying or storing computer-executable instructions and/or data structures. Such computer-readable media can be any available media that can be accessed by a general purpose or special purpose computer system. Computer-readable media that store computer-executable instructions are physical/tangible storage devices/media. Computer-readable media that carry computer-executable instructions are transmission media. Thus, by way of example, and not limitation, embodiments of the invention can comprise at least two distinctly different kinds of computer-readable media: physical computer-readable hardware storage media and transmission computer-readable media.

Physical computer-readable hardware storage media are devices such as RAM, ROM, EEPROM, CD-ROM or other optical disk storage (such as CDs, DVDs, etc.), magnetic disk storage or other magnetic storage devices, or any other hardware devices which can be used to store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions, such as the methods described herein. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising a receiving component that is an instrumented component configured for generating log records for transaction processing associated with a transaction that is processed by multiple components, including at least one component that is not instrumented for logging, the computing system comprising:
   one or more processors; and
   one or more storage device having stored computer-executable instructions that are executable by the one or more processors for causing the receiving component to perform a method comprising:
   receiving a transaction to process from a particular component;
      determining that the particular component is a non-logging component which has not been instrumented for logging the transaction processes; and
   in response to determining that the particular component is a non-logging component, creating an initial passing off log record associated with passing off of the transaction processing from the non-logging component to the receiving component.

2. The computing system recited in claim 1, wherein the method further includes:
   at the receiving component, creating a different passing off log record associated with passing off of the transaction processing from the receiving component to a new logging component.

3. The computing system recited in claim 1, wherein the method further includes:
   at the receiving component, creating a new log record associated with processing the transaction by the receiving component.

4. The computing system recited in claim 1, wherein the determining that the particular component is a non-logging component includes receiving a notification from a remote system other than the particular component that the particular component is a non-logging component.

5. The method of claim 1, wherein the determining that the particular component is a non-logging component includes receiving a notification from a remote system other than the particular component that the particular component is a non-logging component.

6. A computing system comprising a receiving component that is an instrumented component configured for generating log records for transaction processing associated with a transaction that is processed by multiple components, including at least one component that is not instrumented for logging, the computing system comprising:
   one or more processors; and
   one or more storage device having stored computer-executable instructions that are executable by the one or more processors for causing the receiving component to perform a method comprising:
   receiving a transaction to process from a caller component;
   determining that the caller component is a non-logging component that is not instrumented for logging the transaction processes;
   upon determining that the caller component is not instrumented for logging, creating a new log record associated with passing off of the transaction processing from the non-logging component to the receiving component, the new log record being based on a stored log record that includes a transaction ID and an initial component value associated with a previous component that passed processing of the transaction off to the non-logging component, the new log record including the transaction ID and an incremented component value that corresponds to the transaction processing being passed off by the non-logging component; and
   creating a second new log record which is associated with processing of the transaction by the receiving component, the second new log record including the transaction ID, the incremented component value and a new extension component value that is associated with the receiving component.

7. The computing system recited in claim 6, wherein the method further includes:
   the receiving component refraining from creating another new log record for transaction processing received from a calling component upon determining that the calling component is capable of logging transaction processes.

8. The computing system recited in claim 6, wherein the method further includes:
   the receiving component creating a passing off log record associated with passing off of the transaction processing from the receiving component to a new logging component.

9. The computing system recited in claim 8, wherein the passing off log record includes the transaction ID, the incremented component value and new value that increments and is based on the new extension component value.

10. The computing system recited in claim 6, wherein the determining that the particular component is a non-logging component includes receiving a notification from a remote system other than the particular component that the particular component is a non-logging component.

11. A method implemented by a computing system having one or more hardware processors and hardware storage and further comprising a receiving component that is instrumented for logging transaction processes associated with a transaction that is processed by multiple components, including at least one component that is not instrumented for logging, the method comprising:
   the computing system receiving a transaction to process from a particular component;
   the computing system determining that the particular component is a non-logging component which has not been instrumented for logging the transaction processes; and
   the computing system, in response to determining that the particular component is a non-logging component, creating an initial passing off log record associated with passing off of the transaction processing from the non-logging component to the receiving component.

12. The method recited in claim 11, wherein the method further includes:
at the receiving component, creating a different passing off log record associated with passing off of the transaction processing from the receiving component to a new logging component.

13. The method recited in claim 11, wherein the method further includes:
at the receiving component, creating a new log record associated with processing the transaction by the receiving component.

14. The method of claim 11, wherein the determining that the particular component is a non-logging component includes receiving a notification from a remote system other than the particular component that the particular component is a non-logging component.

15. A method implemented by a computing system having one or more hardware processors and hardware storage and further comprising a receiving component that is instrumented for logging transaction processes associated with a transaction that is processed by multiple components, including at least one component that is not instrumented for logging, the method comprising:
the computing system receiving a transaction to process from a caller component;
the computing system determining that the caller component is a non-logging component that is not instrumented for logging the transaction processes;
the computing system, upon determining that the caller component is not instrumented for logging, creating a new log record associated with passing off of the transaction processing from the non-logging component to the receiving component, the new log record being based on a stored log record that includes a transaction ID and an initial component value associated with a previous component that passed processing of the transaction off to the non-logging component, the new log record including the transaction ID and an incremented component value that corresponds to the transaction processing being passed off by the non-logging component; and
the computing system creating a second new log record which is associated with processing of the transaction by the receiving component, the second new log record including the transaction ID, the incremented component value and a new extension component value that is associated with the receiving component.

16. The method recited in claim 15, wherein the method further includes:
refraining from creating another new log record for transaction processing received from a calling component upon determining that the calling component is capable of logging transaction processes.

17. The method recited in claim 15, wherein the method further includes:
creating a passing off log record associated with passing off of the transaction processing from the receiving component to a new logging component.

18. The method recited in claim 17, wherein the passing off log record includes the transaction ID, the incremented component value and new value that increments and is based on the new extension component value.

* * * * *